(12) United States Patent
Keitzer et al.

(10) Patent No.: US 9,712,763 B2
(45) Date of Patent: *Jul. 18, 2017

(54) APPARATUS AND METHOD FOR MULTI-SPECTRAL CLIP-ON ARCHITECTURE

(71) Applicant: FLIR Surveillance, Inc., Wilsonville, OR (US)

(72) Inventors: Scott Keitzer, Export, PA (US); Eugene J. Pochapsky, Cheswick, PA (US); Michael R. Matzko, Murrysville, PA (US)

(73) Assignee: FLIR Surveillance, Inc., Wilsonville, OR (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/633,352

(22) Filed: Feb. 27, 2015

(65) Prior Publication Data
US 2015/0172569 A1    Jun. 18, 2015

Related U.S. Application Data

(63) Continuation of application No. 13/213,836, filed on Aug. 19, 2011, now Pat. No. 8,970,737.
(Continued)

(51) Int. Cl.
*H04N 5/33* (2006.01)
*H04N 5/225* (2006.01)
(Continued)

(52) U.S. Cl.
CPC .......... *H04N 5/332* (2013.01); *H04N 5/2254* (2013.01); *H04N 5/23209* (2013.01); *H04N 5/23293* (2013.01); *H04N 5/243* (2013.01)

(58) Field of Classification Search
CPC .... H04N 5/332; H04N 5/23209; H04N 5/243; H04N 5/23293; G02B 23/12; G02B 23/14; G02B 5/208
(Continued)

(56) References Cited

U.S. PATENT DOCUMENTS 5,035,472 A * 7/1991 Hansen .................. G02B 23/12
                                                            359/356
5,084,780 A * 1/1992 Phillips .................. G02B 23/12
                                                            359/350
(Continued)

FOREIGN PATENT DOCUMENTS

WO    WO 2012/024609    2/2012

OTHER PUBLICATIONS

PCT/US2011/048460, Jan. 5, 2012, International Search Report and Written Opinion.
(Continued)

*Primary Examiner* — Nhan T Tran
(74) *Attorney, Agent, or Firm* — Wolf, Greenfield & Sacks, P.C.

(57) ABSTRACT

An apparatus and method improve sight. The apparatus includes a first sight configured to view a scene. A second sight is configured to alter content representative of the scene in a first manner to form first altered content. A third sight is configured to alter content representative of the scene in a second manner to form second altered content. An image combiner is configured to combine the second altered content with the first altered content to form combined altered scene content.

13 Claims, 3 Drawing Sheets

Related U.S. Application Data

(60) Provisional application No. 61/401,836, filed on Aug. 19, 2010.

(51) Int. Cl.
  *H04N 5/232* (2006.01)
  *H04N 5/243* (2006.01)

(58) Field of Classification Search
  USPC .............. 348/239, 335, 343, 344, 341, 336, 348/333.01; 359/353, 350
  See application file for complete search history.

(56) References Cited

U.S. PATENT DOCUMENTS

| | | | |
|---|---|---|---|
| 5,497,266 A | 3/1996 | Owen | |
| 5,729,010 A * | 3/1998 | Pinkus | G02B 23/12 313/524 |
| 5,745,287 A * | 4/1998 | Sauter | G02B 27/36 359/399 |
| 5,903,996 A * | 5/1999 | Morley | G02B 23/12 359/353 |
| 6,819,495 B2 * | 11/2004 | Shani | G02B 23/125 356/5.01 |
| 6,911,652 B2 * | 6/2005 | Walkenstein | H04N 5/332 250/330 |
| 7,319,557 B2 * | 1/2008 | Tai | G02B 23/12 359/350 |
| 7,333,270 B1 * | 2/2008 | Pochapsky | G02B 23/12 250/330 |
| 7,911,687 B2 * | 3/2011 | Scholz | H04N 5/23293 359/353 |
| 8,970,737 B2 * | 3/2015 | Keitzer | H04N 5/2254 348/239 |
| 2007/0228259 A1 * | 10/2007 | Hohenberger | H04N 5/23293 250/214 LA |
| 2008/0297885 A1 * | 12/2008 | Pochapsky | G02B 23/12 359/353 |

OTHER PUBLICATIONS

PCT/US2011/048460, Feb. 28, 2013, International Preliminary Report on Patentability.
International Search Report and Written Opinion dated Jan. 5, 2012 for Application No. PCT/US2011/048460.
International Preliminary Report on Patentability dated Feb. 28, 2013 for Application No. PCT/US2011/048460.

* cited by examiner

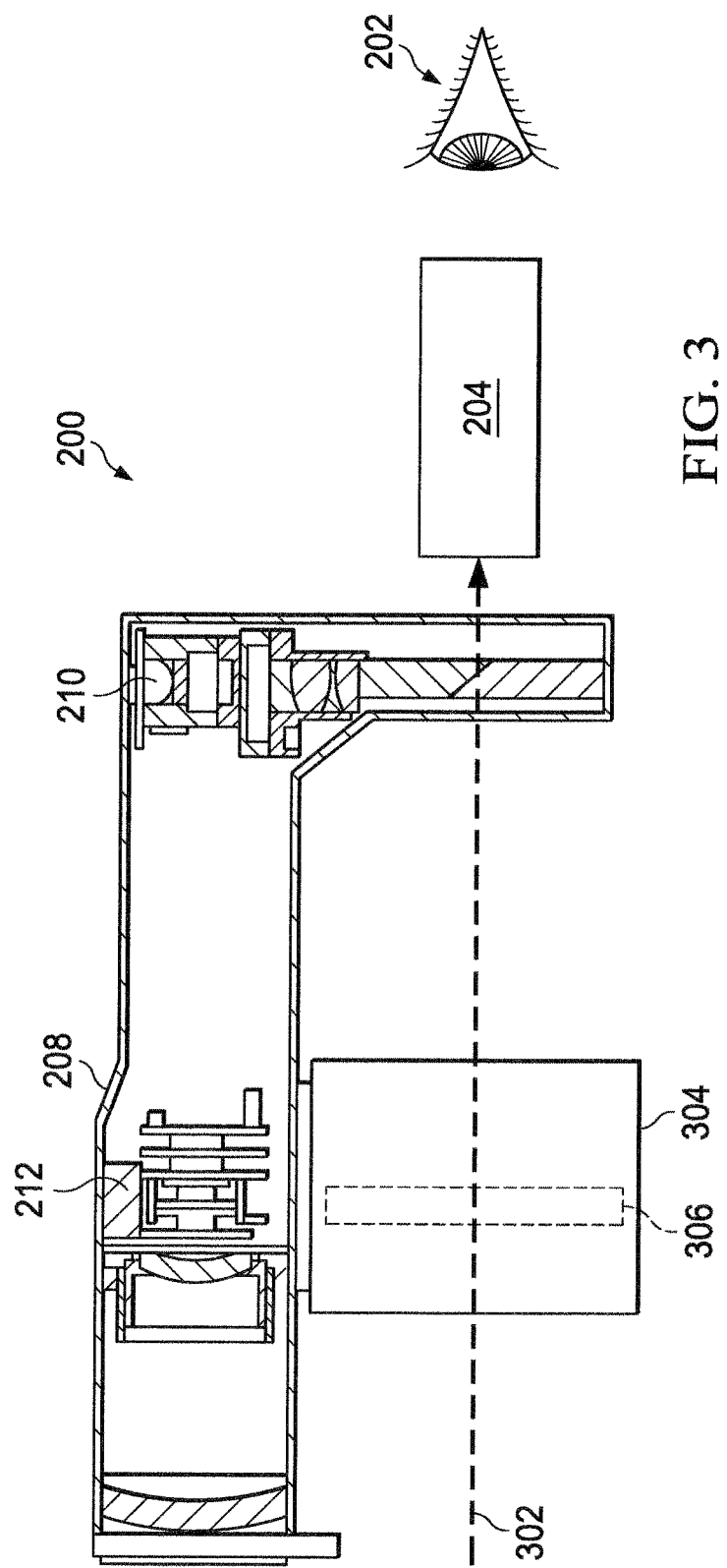

APPARATUS AND METHOD FOR MULTI-SPECTRAL CLIP-ON ARCHITECTURE

CROSS-REFERENCE TO RELATED APPLICATIONS

The present patent application is a continuation of U.S. patent application Ser. No. 13/213,836, entitled "Apparatus and Method for Multi-Spectral Clip-On Architecture," filed Aug. 19, 2011, which claims priority under 35 U.S.C. §119(e) to U.S. Provisional Application Ser. No. 61/401,836, entitled "System and Method for Multi-Spectral Clip-On Architecture," filed on Aug. 19, 2010, the contents of each aforementioned applications are incorporated herein by reference in their entirety.

TECHNICAL FIELD

The present application relates generally to optical systems and, more specifically, to an apparatus and method for multi-spectral clip-on architecture.

BACKGROUND

Often, it is desirable to enhance normal vision when viewing images/objects. In the weapons industry, weapons generally include viewing enhancements such as, for example, a rifle sight, a telescope, a video camera or other optical viewing system. These enhancements typically augment normal vision and improve performance.

However, in different conditions the performance of certain enhancements may be less than desirable. For example, different enhancements designed for use during the day may perform poorly at night time or in other degraded lighting environments.

Accordingly, there is a need for an apparatus and method that improves viewing in poor visible viewing conditions. In particular, there is a need for an apparatus and method for enhancing viewing through optical systems.

SUMMARY

In one exemplary embodiment an apparatus for improving sight is provided. The apparatus includes a first sight configured to view a scene. A second sight is configured to alter content representative of the scene in a first manner to form first altered content. A third sight is configured to alter content representative of the scene in a second manner to form second altered content. An image combiner is configured to combine the second altered content with the first altered content to form combined altered scene content.

In another exemplary embodiment, an apparatus for improving sight is provided. The apparatus includes a first sight configured to view a scene. A mount is positioned along a path between the first sight and the scene. A second sight is adapted to be mounted onto the mount. The second sight is configured to alter content representative of the scene to form altered content and display the altered scene content via the first sight.

In another exemplary embodiment, a method for improving a view of a scene at a first sight is provided. Content representative of the scene is altered in a first manner using a second sight to form first altered content. Content representative of the scene is altered in a second manner using a third sight to form second altered content. The second altered content is combined with the first altered content to form combined altered scene content. The combined altered scene content is displayed and viewable through the first sight.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure and its features, reference is now made to the following description, taken in conjunction with the accompanying drawings, in which:

FIG. 3 illustrates another example configuration for a multi-spectral optical system according to the present disclosure.

DETAILED DESCRIPTION

The present disclosure describes a system and method for a multi-spectral architecture that augments a day weapon sight with multiple sensor-augmented channels for use in night time, degraded, or other conditions that favor the use of selected sensors. While the added image sensors may be referred to herein as "night time image sensors" or "night time sensors," or "infrared sensors" it will be understood that such sensors may be used during the day time and/or under other lighting conditions as well.

Figure 1:
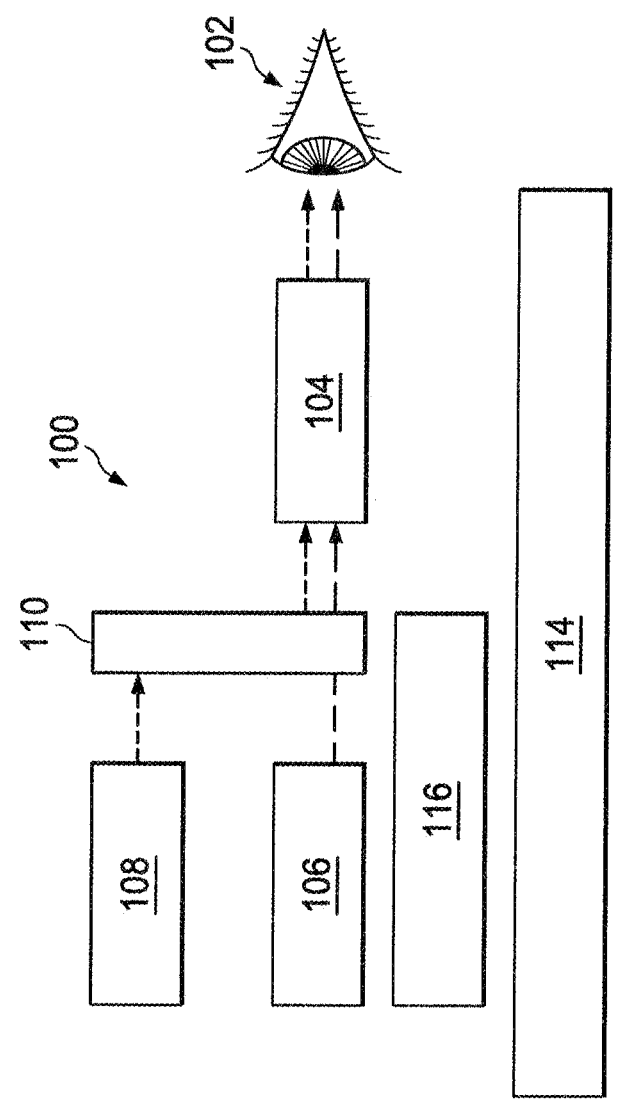
FIG. 1 illustrates a block diagram of a multi-spectral optical system according to the present disclosure.
Figure 1:
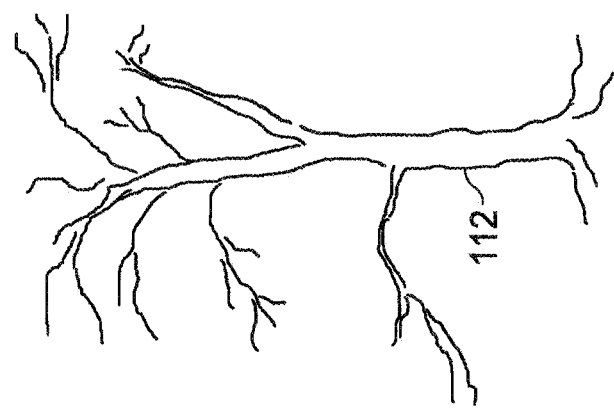

FIG. 1 illustrates a block diagram of a multi-spectral optical system 100 according to the present disclosure. Optical system 100 includes a first sight 104, a second sight 106, a third sight 108 and an image combiner 110.

In this illustrative example, a user 102 employs the first sight 104 to view a scene 112. In one embodiment, the first sight 104 is a day sight for viewing objects in the scene 112. The first sight 104 may be an optical system that provides the user 102 with a magnified view of the scene 112 in the spectrum of visible wavelengths. As will be appreciated, in one application, the first sight 104 is attached to a weapon 114 and used to target the weapon 114. In another application, the first sight 104 may be used for surveillance or other viewing purposes.

In environmental conditions that degrade or prevent viewing of the scene 112, the user 102 may introduce and use the second sight 106. The second sight 106 typically provides a sensor-augmented view of the scene 112, at unity magnification, and substantially without deviation of the apparent angle to the scene 112 as compared to the apparent angle without the second sight 106 installed. For example, during nighttime, the user 102 may add a second sight 106 as a night scope to see objects in the scene 112. The second sight 106 may be referred to as a "clip-on" sight because it is configured structurally to clip/attach/mount onto and off a mounting base 116 on the weapon 114. The mounting base 116 is a surface on which attachments may be mounted to the weapon 114 (e.g. mounting rail).

In one embodiment, the second sight 106 captures an image of the scene 112 in a different waveband, converts the scene content into a visible waveband and displays the converted scene content to the user 102 via the first sight 104. In another embodiment, the second sight 106 may function as an image intensifier. For example, second sight 106 captures an image of the scene 112 in visible and/or near-visible wavelengths then generates and displays an intensified or amplified image to the user 102.

In some embodiments, the second sight 106 includes functionality to display the converted or intensified scene content in a characteristic color (or colors). The use of color may simplify the ability of the user 102 to recognize the operating waveband used by the second sight 106 (or distinguish the image generated by the second sight 106 from the image generated by the first sight 104).

In given applications, the user 102 may also want to observe the scene 112 in a waveband different than that used by the second sight 106. Viewing the scene 112 in two wavebands may reveal information about the scene 112 that is not discernable by viewing only a single waveband. In such embodiments, a third sight 108 is included in the system. Similar to the second sight 106, the third sight 108 functions to provide a sensor-augmented view of the scene 112, at unity magnification, and substantially without deviation of the apparent angle to the scene 112. In another embodiment, the third sight 108 could electronically or optically magnify the scene 112 for surveillance operations.

To enable viewing of the images generated by both the second sight 106 and the third sight 108, optical system 100 includes an image combiner 110. Image combiner 110 receives the images generated by the second and third sights 106, 108 and combines them into a composite or combined image enabling the user 102 to view the combined images via the first sight 104. In one example, the image combiner 110 optically superimposes the image output from the third sight 108 onto the image output from the second sight 106.

Examples of the image combiner 110 may include a fold mirror or coated prism that partially intrudes into the field of view from the side, or a center mounted fold mirror or prism. In one example, the image combiner 110 is a scene injection device. Examples of scene injection devices are described in U.S. Pat. Nos. 7,483,213 and 7,554,740, assigned to the assignee of the present disclosure, and which are incorporated herein by reference.

As previously described, the third sight 108 may display converted or intensified image/scene content in a characteristic color (or colors) different from a characteristic color used by the second sight 106. In this way, the user 102 can distinguish scene waveband content produced by the third sight 108 from that produced by the second sight 106. Other modes of enhancement, such as, for example, edge enhancement or object outlining, could be used in combination with or instead of color difference(s). These other modes of enhancement may assist the user in distinguishing between the separate images of a combined image, and may help to limit the reduction in overall contrast that may occur when two independent images are superimposed.

The illustration of the optical system 100 is not intended to imply any particular physical or architectural limitations in which different embodiments may be implemented. Other components in addition to and/or in place of the ones illustrated may be used. Some components may be unnecessary in some embodiments. Also, the blocks are presented to illustrate some functional components. One or more of these blocks may be combined and/or divided into different blocks when implemented in different embodiments.

Figure 2:
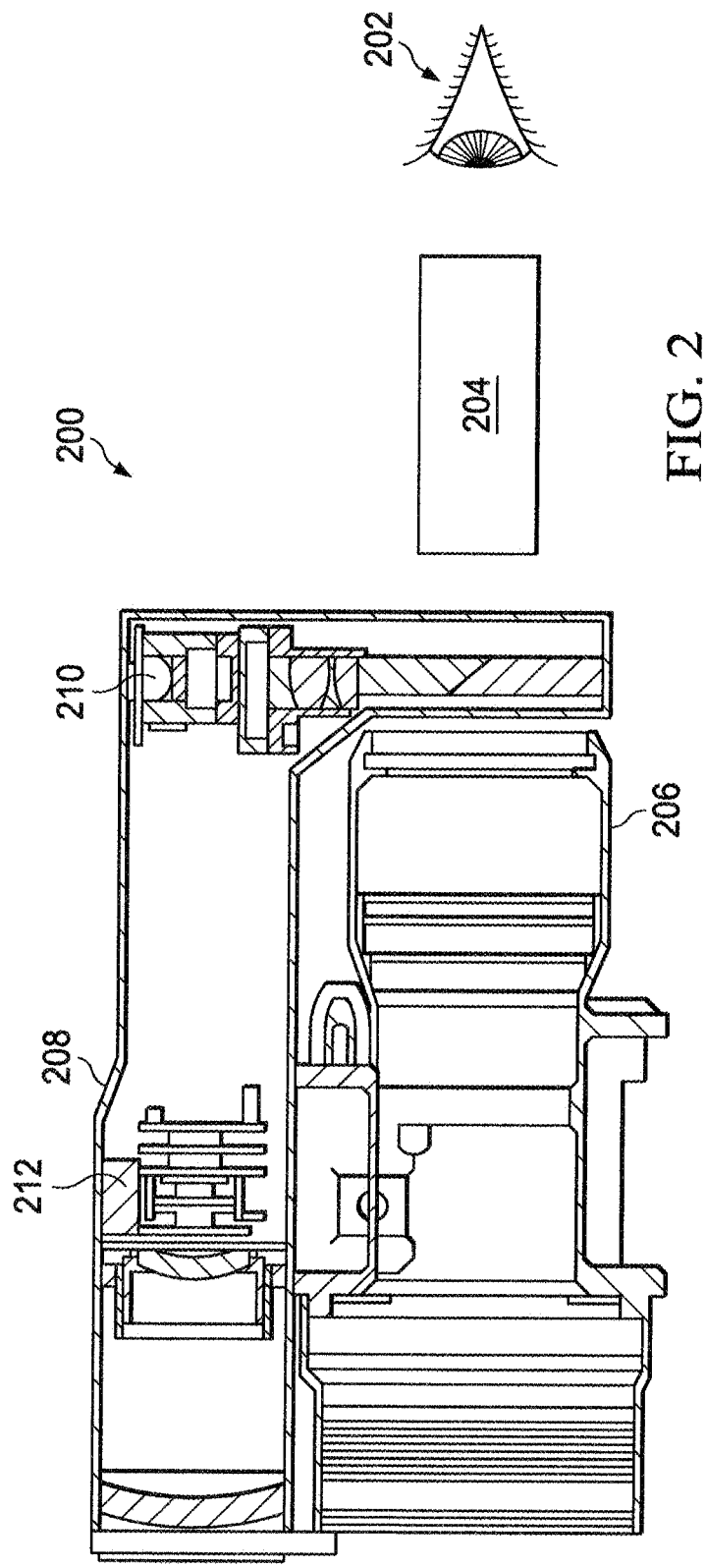
FIG. 2 illustrates an example configuration for a multi-spectral optical system according to the present disclosure.

FIG. 2 illustrates an example configuration for a multi-spectral optical system 200 according to the present disclosure. In this illustrative example, the optical system 200 includes a first sight 204, a lower sight 206 and an upper sight 208.

The lower sight 206 generates a sensor-augmented image of a scene and is mounted or attached (e.g. clip-on) to a mounting base (not shown in FIG. 2, e.g. mounting base 116 in FIG. 1). The lower sight 206 provides this view at unity magnification and without deviation of the apparent angle to the target that would appear without the lower sight 206 installed. Sight 206 is also referred to as "inline" because its line of sight is in line with the optical axis of the sight 204. In various embodiments, the lower sight 206 includes one or more nighttime sensors enabling the generation of the sensor-augmented image. In another embodiment, the lower sight 206 is a thermal inline sight or an image intensified inline sight. In still another embodiment, the lower sight 206 may be a TANS® intensified night sight, manufactured by OmniTech Partners, Inc.

In the embodiment shown in FIG. 2, the system 200 includes the upper sight 208 that is mounted to the lower sight 206 and/or the mounting base (not shown, e.g. mounting base 116 in FIG. 1). The upper sight 208 includes one or more night time image sensors which may be the same, similar or different type than those embodied within the lower sight 206.

The upper sight 208 includes input optics in a sensor 212 to form an image output display with output optics 210. A portion of the output optics 210 is disposed or positioned between the lower sight 206 and the first sight 204. One embodiment of the upper sight 208 may include an optical image generator and injector as described in U.S. Pat. No. 7,554,740, while other embodiments may utilize any other suitable beam combining optics or scene injector. The upper sight 208 also provides unity magnification and is internally optically aligned so that the apparent angle of its output image is essentially the same as the line of sight of its input image. The mechanical alignment between lower sight 206 and upper sight 208 may not be critical to provide the user 202 with an unaltered line of sight originating from either lower sight 206 or upper sight 208.

With only the lower sight 206 installed, the user 202 observes the image output produced by the lower sight 206 through the first sight 204. When the upper sight 208 is added and installed, the user 202 observes the image output from the upper sight 208 as optically superimposed upon (or combined with) the image output of the lower sight 206. This combined image provides the user 202 with a multiple sensor view of the scene. Utilization of multiple sensor views provides an enhanced view of the scene and results in improved targeting and viewing. Both the lower sight 206 and the upper sight 208 are substantially insensitive to alignment problems with respect to the first sight 204 because each includes unity magnification and does not vary the apparent angle from the user 202 to an object in the scene.

In one embodiment, the upper sight 208 may be configured to mechanically interface (e.g., attach, mount) with the lower sight 206, and the upper sight 208 may be attached or detached from the lower sight 206 as desired needed. In another embodiment, the upper sight 208 is configured to mechanically interface with a mounting base/rail or other surface (e.g. mounting base 116 in FIG. 1) of a weapon (e.g. weapon 114 in FIG. 1 or other underlying support structure) to which the first sight 204 and the lower sight 206 are also interfaced/mounted. In another embodiment, the upper sight 208 may be configured to mechanically interface with both the lower sight 206 and mounting base/rail or other surface.

In the embodiment shown in FIG. 2, at least a portion of the upper sight 208 (e.g., the input optics 212) is disposed or positioned directly above the lower sight 206. In a different embodiment, the relative position or orientation of the upper sight 208 with respect to the lower sight 206 may be changed (e.g., the upper sight 208 is no longer directly above the lower sight 208, such as along its side). In such embodiments, the centerline (or optical axis) of the upper sight 208 may be left or right of the centerline (or optical axis) of the lower sight 206 and the centerline (or optical axis) of the first sight 204. Accordingly, the upper sight 208 may be in any other relative position with respect to the first sight 204 provided it is able to function as described and intended herein. For example, the optical centerlines of the lower sight 206 and the upper sight 208 may be close enough to parallel to allow outputs of the lower sight 206 and the upper sight 208 to partially overlap.

However, it should be understood that neither absolute parallelism or a static orientation between the mechanical axes of lower sight 206 and the upper sight 208 may be required for proper operation, since the apparent angle from the location of the user 202 to a point in the scene is undeviated by either the lower sight 206 and the upper sight 208. This behavior may be the result of the unity magnification and input to output optical axis alignment of lower sight 206 and upper sight 208. For example, because lower sight 206 and upper sight 208 may not independently alter their independent lines of sight, when combined the resultant combined line of sight is also unaltered. Similarly, the mechanical axes of the lower sight 206 and the upper sight 208 do not need to be parallel with respect to the optical axis of the first sight 204. For example, both upper sight 208 and lower sight 206 have a look-through line of sight that is optically independent from the mechanical axis of either sight. For example, each input ray is parallel to each resultant output ray.

In these examples, the lower sight 206 is fully independent from the upper sight 208, and the lower sight 206 may operate without the upper sight 208 attached. Similarly, the upper sight 208 is independent from the lower sight 206 and may operate without the lower sight 206.

In further embodiments, the upper sight 208 and the output optics 210 may be mounted in a common housing and attached and detached together as a single unit. Additionally, the output optics 210 and the upper sight 208 may be separate, and may be separately mounted to the lower sight 206 and/or underlying support. In such embodiment, the upper sight 208 may be removed with the output optics 210 remaining installed to enable status indications or other visible messages generated by the output optics 210 to be injected into the image generated and output from the lower sight 206 (being viewed through the first sight 204).

FIG. 3 illustrates another example configuration for a multi-spectral optical system according to the present disclosure. In the example configuration for the optical system 200 illustrated in FIG. 2, the upper sight 208 is mounted to the lower sight 206. In the example configuration for the optical system 200a in FIG. 3, a mounting structure 304 is provided for mounting the upper sight 208 in the absence of the lower sight 206. In this example, the mounting structure 304 is a mechanical substitute for the lower sight 206.

This configuration has the benefit that a user may not desire to utilize both the lower sight 206 and the upper sight 208 but desires to utilize the capabilities or features provided by the upper sight 208. This configuration allows use of the upper sight 208 in a "look-through configuration" with the first sight 204 alone.

Light 302 from an image/scene passes through (or alongside) the mounting structure 304 to the output optics 210 for combining with the image from the upper sight 208 for viewing through the first sight 204. In one application, this configuration could provide a look through visible scene blended with a thermal scene.

In another embodiment, the mounting structure 304 may include an optical filter 306. For example, without limitation, the filter 306 may be a partial blocking filter, color filter, complete blocking filter or other filter suitable for enhancing the thermal overlay scene. The filter 306 can be selected by the user for a particular environmental situation, and may include adjustability for transmission/color allowing the user to adjust the characteristics of the directly viewed scene to complement the image/scene as output through the upper sight 208.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a first sight configured to view a scene;
    a second sight configured to alter content representative of the scene in a first manner to form first altered content;
    a third sight configured to alter content representative of the scene in a second manner to form second altered content, the third sight configured to be mounted to and removed from the second sight; and
    an image combiner configured to combine the second altered content with the first altered content to form combined altered scene content.

2. The apparatus according to claim 1, further comprising a housing unit that houses the image combiner and the third sight, wherein the third sight is configured to be mounted to and removed from the second sight by mounting and removing the housing unit from the second sight.

3. The apparatus according to claim 1, wherein the third sight and the image combiner are separate from one another such that the third sight can be removed from the second sight without removing the image combiner.

4. The apparatus according to claim 1, further comprising:
    a first sensor in the second sight, the first sensor configured to augment a view of the scene in the first manner to produce the first altered content.

5. The apparatus according to claim 1, wherein, in combining the second altered content with the first altered content, the image combiner is further configured to display the second altered content in line with the first altered content to form the combined altered scene content.

6. The apparatus according to claim 1, wherein the combined altered scene content is viewable via the first sight.

7. The apparatus according to claim 1, wherein the second sight is configured to display the first altered content via the first sight.

8. The apparatus according to claim 1, wherein the third sight comprises input optics that are separate from input optics of the second sight.

9. The apparatus according to claim 8, wherein the third sight is configured to display the combined altered scene content via the first sight.

10. The apparatus according to claim 1, wherein, in combining the second altered content with the first altered content, the third sight is further configured to provide the combined altered scene content viewable through the first sight at an apparent angle to a target in the scene that is substantially equal to an angle to the target viewable through the first sight without the second and third sights.

11. A method for improving a view of a scene at a first sight, the method comprising:
- augmenting a view of the scene in a first manner to form first altered content using a second sight;
- augmenting a view of the scene in a second manner to form second altered content using a third sight that is configured to be mounted to and removed from the second sight;
- combining the second altered content with the first altered content to form combined altered scene content; and
- displaying the combined altered scene content viewable through the first sight.

12. The method according to claim 11, wherein augmenting the view of the scene in the first manner is done, at least in part, using a first sensor of the second sight.

13. The method according to claim 11, wherein augmenting the view of the scene in the second manner is done, at least in part, using a second sensor of the third sight.

* * * * *